Jan. 3, 1939.  J. H. COYLE  2,142,631
BRAKE CONTROL SYSTEM
Filed Feb. 25, 1937  3 Sheets-Sheet 3
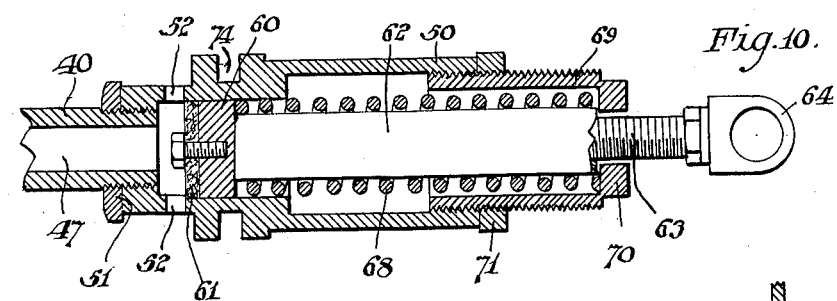
Fig.10.
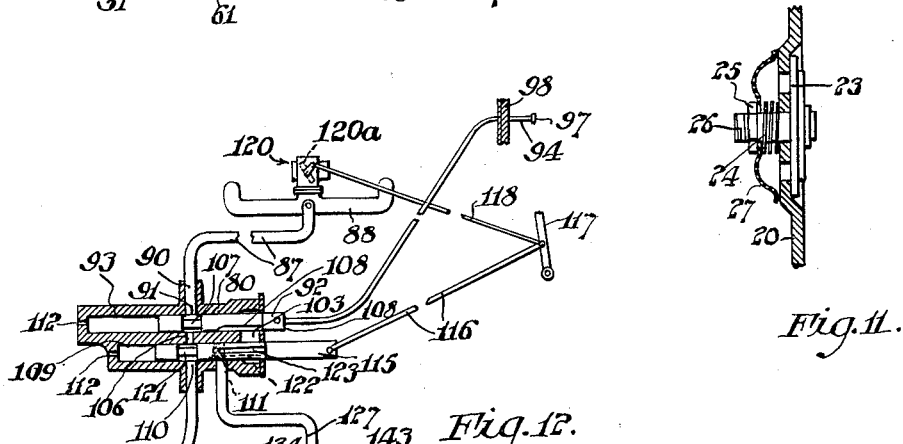
Fig.12.
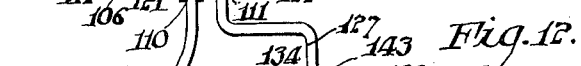
Fig.11.
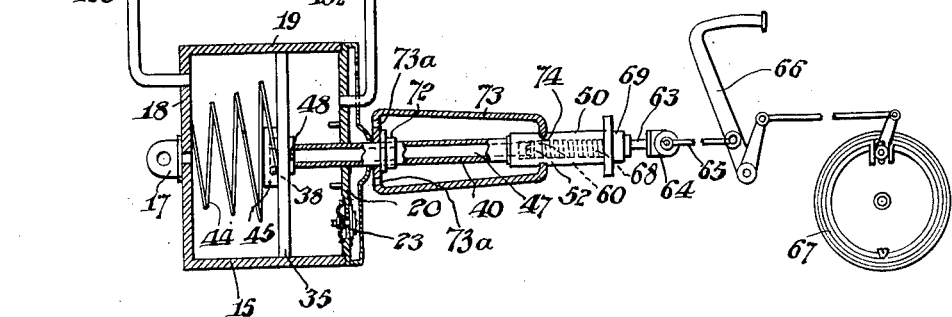
Inventor:
Joseph H. Coyle,
By Z.T.Wolsensmith
Attorney.

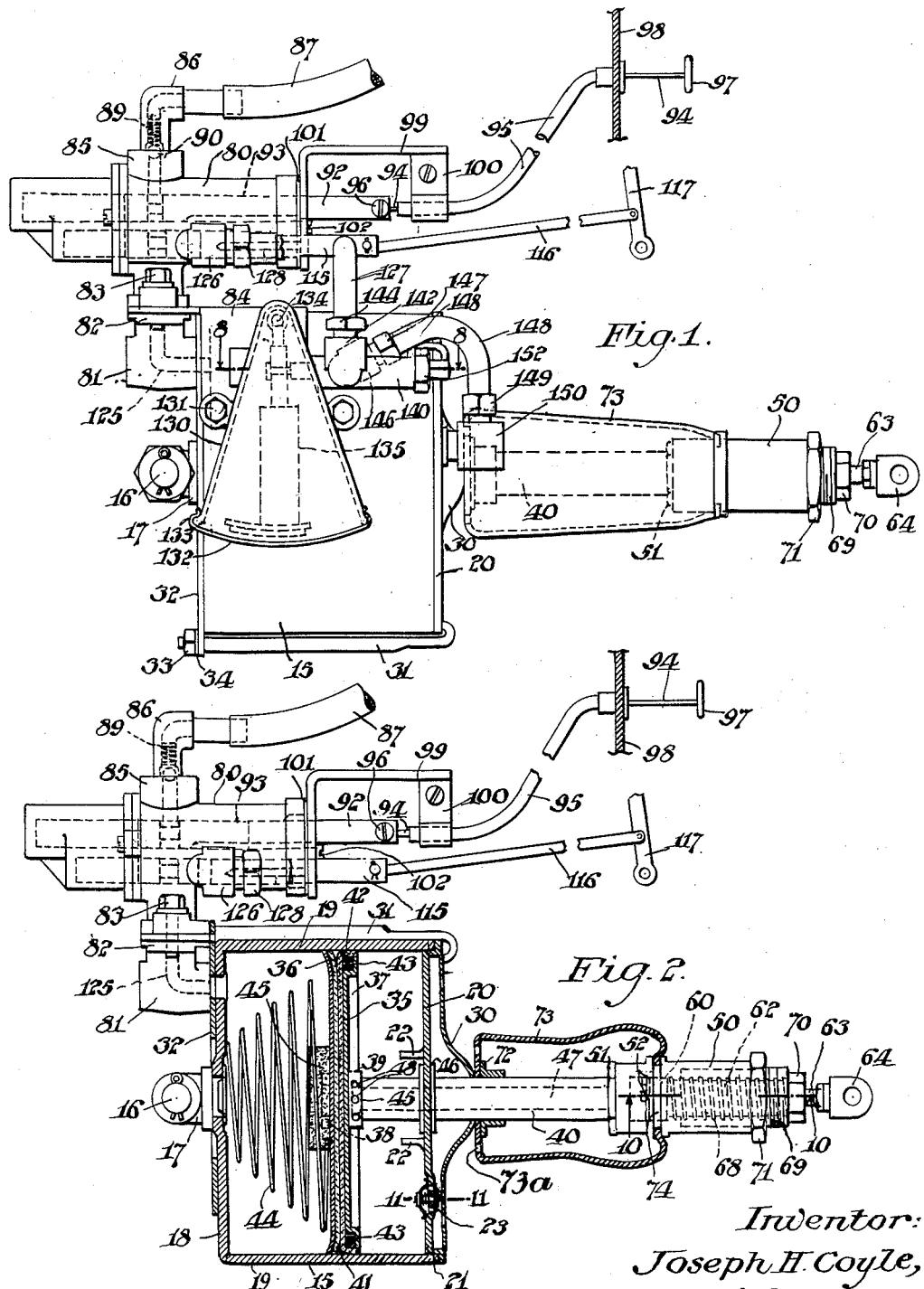

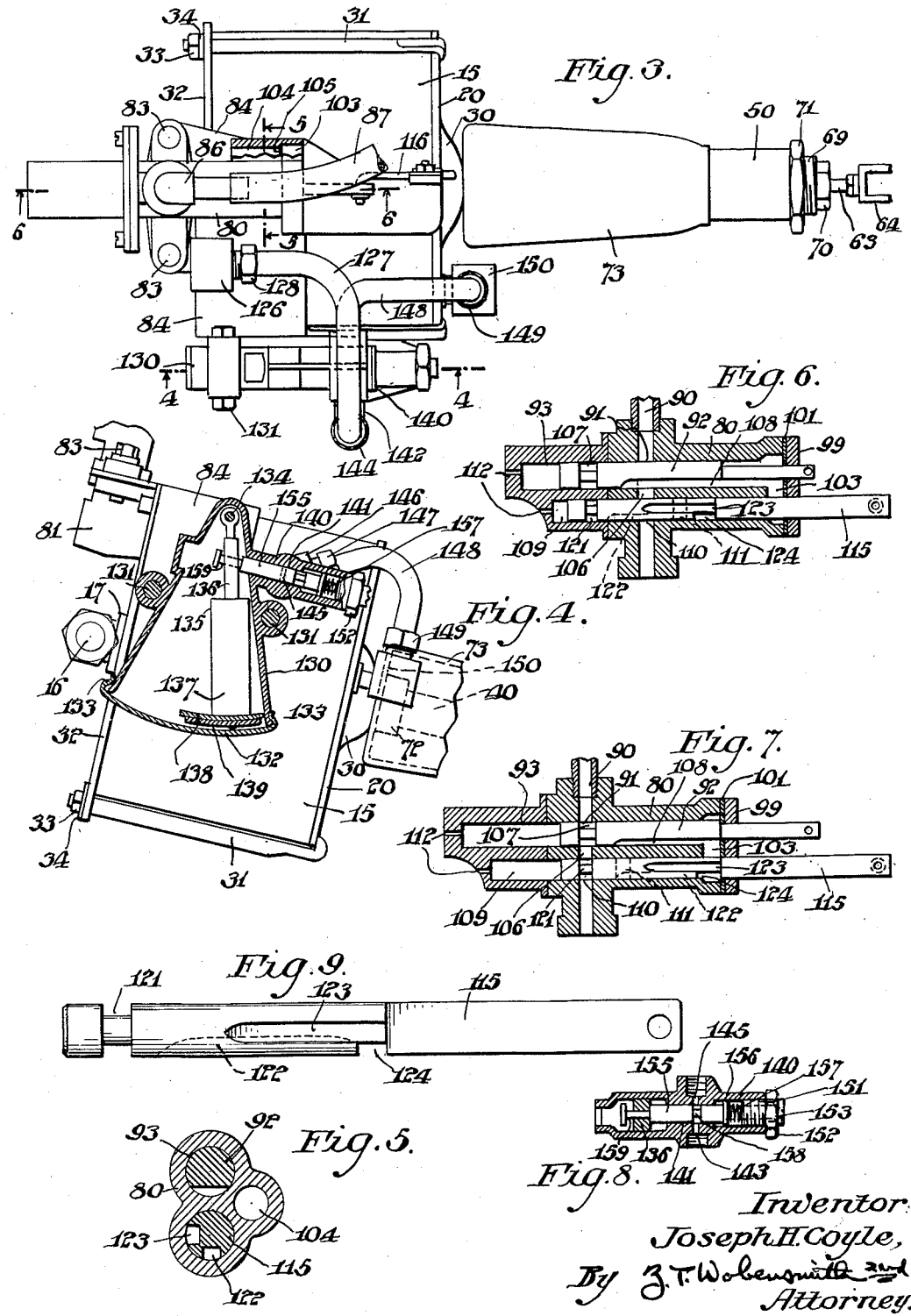

Patented Jan. 3, 1939

2,142,631

UNITED STATES PATENT OFFICE 2,142,631

BRAKE CONTROL SYSTEM

Joseph H. Coyle, Long Hill, Conn., assignor to Joseph H. Coyle, III, Philadelphia, Pa.

Application February 25, 1937, Serial No. 127,612

12 Claims. (Cl. 192—3)

This invention relates to brake control systems, and more particularly to a system adapted to effect an application of the brakes under certain predetermined conditions and to effect a release of the brakes under other predetermined conditions. This invention also relates to systems for use in facilitating the starting of an automobile when the same has been brought to rest on an upward incline with the brakes applied.

Considerable difficulty is sometimes encountered in handling an automobile on an upward incline. This occurs not only when the vehicle has been stopped at a traffic light or for some other cause, at which time the automobile may tend to roll backwards, but also upon starting the car into motion. This difficulty arises primarily because of the necessity, with practically all the automobiles now in use, for actuating the clutch release pedal with one foot, releasing the brakes of the vehicle either with the other foot or by hand while at the same time actuating the accelerator pedal to supply additional fuel to the engine for the increase starting torque.

It is an object of the present invention to provide a brake control system which will under certain conditions apply the brakes of the vehicle and maintain the brakes in an applied position, subject to the control of the operator of the vehicle.

It is a further object of the present invention to provide a brake control system which is effective under certain predetermined conditions to release the brakes of an automobile upon the actuation of the accelerator pedal.

It is a further object of the present invention to provide a brake control system for automobiles which includes a control element responsive to the inclination of the automobile.

It is a further object of the present invention to provide a brake control system which will exert one character of control when the car is on the level or with the front end inclined downwardly, and which will exert a different character of control when the vehicle faces upwardly on a hill.

It is a further object of the present invention to provide a structure for controlling the application and release of the brakes of a motor vehicle which structure utilizes the vacuum created in the intake manifold of the vehicle.

Other objects of the present invention will appear from the annexed specification and claims.

The nature and characteristic features of my invention will be more readily understood from the following description, taken in connection with the accompanying drawings forming part thereof in which:

Figure 1 is a side elevational view of a preferred embodiment of the invention;

Fig. 2 is a side view of the device shown in Fig. 1 partly in elevation and partly in vertical section, and illustrating certain details of the construction of the cylinder and piston;

Fig. 3 is a top plan view of the device shown in Fig. 1, part of the valve housing being broken away to show the internal construction thereof;

Fig. 4 is a fragmentary vertical sectional view taken approximately on the line 4—4 of Fig. 3, and illustrating the effect of the inclination on a hill;

Fig. 5 is a vertical sectional view taken approximately on the line 5—5 of Fig. 3;

Figs. 6 and 7 are fragmentary vertical sectional views taken respectively on the line 6—6 of Fig. 3, showing different positions of two of the control valves;

Fig. 8 is a horizontal sectional view taken approximately on the line 8—8 of Fig. 1;

Fig. 9 is a side elevational view of one of the control valve members removed from the valve housing;

Fig. 10 is an enlarged fragmentary sectional view taken approximately on the line 10—10 of Fig. 2, and illustrating the construction of the compensating valve;

Fig. 11 is an enlarged fragmentary sectional view taken approximately on the line 11—11 of Fig. 2, and illustrating the construction of the atmospheric check valve; and Fig. 12 is a diagrammatic view of the system of the present invention illustrating the manner in which the control of the vehicle brakes is effected.

It will, of course, be understood that the description and drawings herein contained are illustrative merely, and that various modifications and changes may be made in the structure disclosed without departing from the spirit of the invention.

Referring more particularly to the drawings, the control system of the present invention includes a cylinder 15 which may be secured to a portion of the frame or body (not shown) of the automobile in any suitable manner, although a stud 16, extending through a bracket 17 secured in the end of the cylinder 15, has been found suitable for this purpose. The longitudinal or horizontal axis of the cylinder 15 is preferably disposed so as to be parallel with the longitudinal or horizontal axis of the vehicle. The cylinder 15 may be of any preferred construction, but a cylinder having an end wall 18 facing toward the front end of the vehicle and illustrated as to the left in the drawings, and a side wall as at 19 integral with the end wall 18, has been found satisfactory.

The other end of the cylinder 15, which faces toward the rear end of the vehicle and is illustrated as to the right, is closed by a cylinder head 20, suitable packing being provided as at 21. The cylinder head 20 is provided with a plurality of inwardly extending fingers 22 for limiting the movement of the piston, as hereinafter pointed out.

An atmospheric check valve 23 which is shown in detail in Fig. 11 is provided in the cylinder head 20, to open outwardly. The check valve 23 is normally held seated by a spring 24, and a nut 25 on the valve stem 26 provides for adjustment of the force applied by the spring 24 so that the opening of the valve 23 is suitably controlled, as hereinafter more fully referred to. A screen 27 may be provided adjacent the valve 23.

A suitable protective cover 30 which does not interfere with the operation of the check valve 23 may be mounted externally with respect to the cylinder head 20, the cylinder head and cover being held in position by a plurality of hooked clamping members 31 in engagement with the cylinder head 20, the other ends of the clamping members 31 extending through a spider 32 at the opposite end of the cylinder 15. The hooked clamping members 31 are held in assembled relationship by nuts 33 which bear on lock washers 34 in contact with the arms of the spider 32.

A piston 35 is mounted within the cylinder 15 for reciprocal movement therein, this piston 35 being composed of dished plates 36 and 37 which are held together by nuts 38 and 39 on a piston rod 40, and carry at their outer edges a suitable expansible packing 41 and a suitable packing leather 42 which is pressed outwardly and into contact with the internal wall of the cylinder 15 by a circular leaf spring 43. A spiral spring 44, the convolutions of which may rest one within another, is mounted at the left hand portion of the cylinder 15 between the end wall 18 and the plate 36 of the piston 35, and normally exerts a force on the piston 35 tending to move the piston 35 towards the right, as illustrated in the drawings.

Movement of the piston 35 into contact with the cylinder head 20 is prevented by the fingers 22. To the left hand face of the piston 35 there is also secured an annulus 45 of felt or similar material which prevents the piston 35 from striking or coming into contact with the end wall 18 of the cylinder 15. The piston rod 40 extends through a suitable packing 46 in the cylinder head 20.

The piston rod 40 is provided with a passageway 47 which communicates freely at its left hand or forward end through suitable openings 48 with the space at the right hand or rear side of the piston 35. The piston rod 40 has threaded on its outer extremity a sleeve 50 which is locked in position with respect to the piston rod 40 by a nut 51. The sleeve 50 has apertures 52 therein, so that the passageway 47 may be connected to the atmosphere under certain predetermined conditions.

A compensator valve 60 is mounted within the sleeve 50 and seats against the end of the piston rod 40 in such a manner as to normally cut off communication between the apertures 52 and the passageway 47. The head 61 of the compensator valve 60 has a rod 62 secured thereto to which a smaller rod 63 is connected, the rod 63 having threaded thereon a clevis 64 for connection by a rod 65 with the brake mechanism, shown diagrammatically at 66 and 67, of the brake system of the vehicle, as hereinafter more fully pointed out. The compensator valve 60 is normally held seated by a spring 68 which bears at its outer extremity in a compensator valve adjusting sleeve 69 which is threaded within the sleeve 50, may be turned by means of the end portion 70, and is adapted to be locked by means of a lock nut 71 in a position to provide the desired force on the spring 68. The spring 68 is adapted to be compressed by a force applied to move the piston 35 to the left, the force on the spring in the opposite direction being derived from the force necessary to apply the brakes.

The cylinder head cover 30 is provided with a rim portion 72 for the reception of one end of a sleeve 73 of rubber or other suitable material for keeping the piston rod 40 from becoming coated with dirt or mud. The sleeve 73 may have suitable apertures 73a therethrough to permit air to pass to the interior of the sleeve, although if the apertures are omitted leakage past the ends of the sleeve will be sufficient. The other end of the sleeve 73 is received in an annular slot 74 in the sleeve 50.

The structure for pneumatically controlling the movement of the piston 35 within the cylinder 15, and thereby controlling the release of the brakes, may be of any preferred type, but preferably provides for three types of control. These types of control preferably include a control operable from the dash board or instrument panel, a control operable from the accelerator pedal of the vehicle, and a control responsive to the inclination of the vehicle.

In the embodiment of the invention herein disclosed, the dash board control valve and pedal control valve are enclosed in a valve housing 80. The housing 80 is mounted above the cylinder 15 on a boss 81 which extends outwardly from the end of the cylinder 15.

The valve housing 80 is secured to flared portions 82 of the boss 81 by means of bolts 83 which also serve to hold in position a mounting bracket 84.

The upper side of the valve housing 80 is provided with a coupling portion 85 into which an elbow 86 is threaded.

The elbow 86 is connected by suitable tubing 87 to the intake manifold of the motor of the vehicle, shown diagrammatically at 88 in Fig. 12, or to any other suitable source of suction. The elbow 86 may, if desired, although it is not essential, be provided with a check valve 89 responsive to and opening when there is a vacuum in the line 87, and shutting off flow from the conduit 87 when the pressure therein rises to that of the atmosphere. A passageway 90 within the elbow 86 communicates with a port 91 in the valve housing 80, as will be seen more clearly from Figs. 6 and 7.

The dash board control mechanism includes a dash board control valve 92 which is mounted within the valve housing 80 and preferably includes a slide valve member in the form of a rod 70 movable along a valve receiving space 93 in the housing 80, and manually operable from the dash board of the vehicle. A wire 94, enclosed in a flexible protective covering 95 is employed for operating this valve and may be attached thereto by inserting the cable wire 94 in an aperture in the end of the valve member 92 and clamping the wire by means of a screw and lock nut 96. A suitable handle 97 is mounted on the dashboard, shown diagrammatically at 98, for manually operating the cable wire 94.

A support for the end of the encasing portion of the flexible covering 95 is provided and includes a bracket 99 having an end portion carrying a screw clamp 100, the other end portion of the bracket 99 serving as a cover plate for the end of the valve housing 80. A packing ring 101 is inserted between the end of the valve housing 80 and the bracket portion 99, and screws 102 are provided for holding the bracket 99 in position.

The valve housing 80 has a chamber 103 therein which is closed at the end by the cover plate 99. The chamber 103 is in communication with the atmosphere through a passageway 104 (see Figs. 3 and 5) which permits the entrance of air at atmospheric pressure, or the exhaust of air therethrough, a screen 105 being mounted in this passageway for preventing the entrance of dirt into the system.

The valve casing 80 has a port 106 disposed on the opposite side of the valve receiving space 93 from the port 91. The slide valve 92 is provided with a passageway as at 107 for affording communication between the port 91 and the port 106, under certain conditions and when it is desired to have the brake control system effective. The slide valve 92 is likewise provided with a passageway as at 108 which communicates with the chamber 103 in the valve housing 80, and is adapted under certain conditions of operation and when it is desired not to utilize the brake control system, to be brought to a position to connect the port 106 through the chamber 103 with the atmosphere.

It will be seen that the slide valve 92 may be moved to either control position, as desired, by means of the handle 97.

The valve housing 80 is also provided with a second valve receiving space 109. The valve receiving space 109 is provided with a port 110 which is oppositely disposed with respect to the port 106 and in alinement therewith. On the side of the valve receiving space 109 and spaced from the port 110, a square side port 111 is provided, the purpose of which will be hereinafter more fully referred to. Suitable vent ports 112 may be provided in the valve housing 80 at the ends of the valve receiving spaces 93 and 109.

The accelerator pedal control valve mechanism includes a control valve 115 mounted within the valve receiving space 109, the valve member 115 preferably being in the form of a rod and having suitable passageways therein. This valve rod 115 is connected by an operating rod 116 to the accelerator pedal arm 117, the arm 117 also being connected as by a rod 118 to a throttle valve 120a on a carburetor 120, so that the valve member 115 is actuated in unison with the accelerator pedal 117. The valve member 115 is provided with a passageway 121 which may be moved to a position for alinement between the port 106 and the port 110.

The valve member 115 is also provided, in the under side thereof, with a groove 122 forming a passageway, which is adapted to be moved by the actuation of the valve member 115, into a position in communication with the port 110.

The outer portion of the groove 122 communicates with the chamber 103 in the valve housing 80 and therethrough with the atmosphere. The valve member 115 is also provided on the side thereof with a second groove 123 which provides a passageway for communication with the side port 111. The end of the groove 123 may be rather shallow for the purpose of restricting the flow past this point when the extremity of the groove 123 is moved past the edge of the port 111. The groove 123 also communicates at its other end with the chamber 103 in the valve housing 80, and communicates with the groove 122 by means of a slot 124.

The port 110 in the valve housing 80 communicates through a passageway 125 in the boss 81 with the left hand end of the cylinder 15.

A coupling boss 126 is provided on the valve housing 80 and has therein a passageway in communication with the side port 111. A pipe 127 is secured in the coupling boss 126 preferably by means of a threaded coupling member 128.

The bracket 84, referred to above, has mounted thereon the structure which provides a control responsive to the inclination of the vehicle. This control mechanism will be hereinafter referred to as a pendulum control mechanism by reason of its manner of operation.

The pendulum control mechanism preferably includes a generally triangular casing 130 which is mounted on the bracket 84 by means of bolts 131. A cover 132 is removably secured on the lower end of this casing 130 by spring hooks 133. The upper end of the pendulum control casing 130 has mounted therein a bearing pin 134 on which a pendulum member 135 is swingably supported for movement within the confines of the casing 130.

The pendulum member 135 includes a forked portion 136 and a lower end portion 137 weighted with lead or other suitable material. The lower end 137 of the pendulum member 135 is preferably provided with a strip of felt 138 and a retaining strip of metal 139 which are mounted at right angles with respect to the longitudinal axis of the pendulum member 135.

The end portions of the felt strip 138 are adapted upon movement of the pendulum 135 about the axis furnished by the bearing pin 134, to contact the lower inner walls of the casing 130 and cushion the movement of the pendulum member 135, as well as provide limits for the movement thereof. It will be noted that when the vehicle is level, the pendulum 135 will tend to assume the position shown in Fig. 1 and that an oscillatory or chattering movement thereof will take place, as hereinafter referred to. When the front end of the vehicle is elevated the pendulum will swing about its axis 134 and tend to assume a different position with respect to the casing 130, as indicated in Fig. 4.

The pendulum casing 130 has an outwardly extending portion 140 within which there is provided a pendulum valve chamber 141. At the side of the portion 140 which faces away from the cylinder 15, a coupling 142 is provided which has a passageway therein. The coupling 142 is threaded into the outwardly extending portion 140 and the passageway therein is in communication with a port 143.

The pipe 127, connected to the coupling boss 142 by the coupling member 144, provides for communication between the port 143 and the square port 111.

The valve chamber 141 is also provided with a port 145 which is oppositely disposed with respect to the port 143, and is connected by coupling members 146 and 147, a pipe 148, and coupling members 149 and 150 with the right hand end of the cylinder 15. The end of the outwardly extending portion 140 has a sleeve 151 threaded therein which is locked in adjusted position by a nut 152. The outer end of the sleeve 151 is closed except for a small relief aperture 153 which extends therethrough for preventing the building up of a pressure or vacuum in the end portion of the valve chamber 141 which would interfere with the operation of the mechanism therein. An adjustment slot for the reception of a screw driver is likewise provided in the end of the sleeve 151.

A pendulum control valve 155 is mounted in the valve chamber 141 and has an enlarged end portion 156, a spring 157 being interposed between the end portion 156 and the inner wall of the sleeve 151. The pendulum valve 155 has a passageway 158 for alinement with the ports 143 and 145, the other end of the valve rod 155 being slotted or grooved as at 159 for disposal in the forked portion 136 of the pendulum member 135.

The position of the pendulum 135 will determine the positioning of the pendulum valve 155 so that when the vehicle is level or is inclined downwardly the pendulum 135 will be in a position such that communication will be established through the passageway 158 between the ports 143 and 145 (note Fig. 8). When the vehicle is inclined upwardly, the pendulum 135 will move the pendulum valve 155 to a position such that communication between the ports 143 and 145 will be cut off (see Fig. 4). It will be noted that the pendulum member 135 and the pendulum control valve 155 move very readily and that a chattering action of the pendulum control valve may occur.

The mode of operation of the system will now be pointed out.

The elbow 86 is in communication with a suitable source of suction, such as the intake manifold 88 of the engine.

When the operator of the car desires to utilize the apparatus, the handle 97 on the dash board 98 is pulled out to move the dash board control valve member 92, to the proper position so that the passageway 107 connects the port 91 with the port 106.

With the dash board control valve member 92 positioned as just referred to, two characteristic modes of operation are possible in accordance with the positioning of the vehicle. In one type of operating condition the vehicle is level and in the other the vehicle has the forward end inclined upwardly on a hill.

The operating condition when the car is level will be considered first. If it is desired to utilize the apparatus, the operator, by and upon the release of the accelerator pedal 117 effects actuation of the accelerator control valve 115 so that that valve is moved to a position as shown in Figs. 1, 7 and 12.

A vacuum is thus applied against the left hand side of the piston 35 through the port 106 in the valve housing 80, the passageway 121 in the accelerator control valve 115, the port 110 and the passageway 125 in the boss 81 in communication with the left hand end of the cylinder 15. This vacuum is maintained so long as the valves 92 and 115 are in the position shown in Fig. 7. The piston 35 accordingly tends to be drawn by the vacuum toward the left hand end of the cylinder 15 against the force of the spring 44. As the piston 35 moves to the left the piston rod connected thereto likewise moves to the left and the end of the piston rod is pulled away from the head 61 of the compensator valve 60, against the force of the spring 68, and admits air through the apertures 52, the passageway 47, and the openings 48, to the right hand end of the cylinder 15.

The forces acting on the piston 35 move the piston to the left and the forces acting through the piston rod 40, the sleeve 50, the spring 68, the rod 62, the rod 63, the clevis 64 and the rod 65 connected to the brake system 66, 67, accordingly effect an applying of the brakes. The compensator valve 60 may be held open to admit air during the movement of the piston 35 in applying the brakes and may also be held open during the time the brakes are held applied, the action of the valve 60 being determined by the setting of the spring 68.

The brakes as thus applied will remain in the applied condition so long as the vacuum is maintained at the left hand end of the cylinder 15 whether by the continuous running of the engine, or the operation of the check valve 89.

When it is desired to release the brakes applied as aforesaid, the accelerator pedal 117 is pressed, and the movement thereof through the rod 116 moves the accelerator control valve 115 to a position where it first shuts off the vacuum theretofore effective through the ports 106 and 110. Air is admitted through the passage 104, the chamber 103 and the groove 122 to the port 110. It will be noted that the forward end of the groove 122 is designed to permit a gradual flow to the port 110 if a gradual brake releasing action, under the control of the operator, is desired. Upon the admission of the air from the port 110 through the conduit 125 to the left hand end of the cylinder 15, air at atmospheric pressure is applied against the left hand face of the piston 35. This tends to move the piston towards the right, as shown in the drawings, aided by the spring 44, and the right hand end of the cylinder 15 is connected to the atmosphere through the pendulum control valve 155 and its fluid connections. It will be noted that upon a slight forward movement of the car the pendulum will be caused to oscillate and this movement of the pendulum will be communicated to the pendulum control valve 155 and cause the valve to oscillate or chatter by reason of the swinging of the pendulum when such movement occurs. Any tendency of the pressure at the right hand end of the cylinder 15 to increase unduly will also be prevented by the opening of the atmospheric check valve 23, and the exhausting of air therethrough from the right hand side of the piston 35 to the atmosphere. The brakes are accordingly released under the control of the operator.

The other condition of operation referred to above is that in which the forward end of the car is facing upwardly on a hill. When it is desired to apply the brakes, this is accomplished, as before, by releasing the accelerator pedal 117. A vacuum is applied against the left hand end of the piston 35, as before, through the port 106, passageway 121, port 110 and conduit 125. Air is admitted to the right hand end of the cylinder 15, as heretofore pointed out, by the compensating valve 60, which opens against the force of the spring 68 by movement of the piston 35 and the separation of the end of the valve rod from the head 61 of the compensator valve 60. Air enters the openings 52 and passes through the passageway 47, and the openings 48 to the right hand end of the cylinder 15. The piston 35, having a vacuum on the left hand side thereof and air at atmospheric pressure on the right hand side thereof, moves against the force of the spring 44 towards the left and, as pointed out above, applies the brakes.

The brakes, when applied in this manner, are held in applied position until released by the operator of the vehicle as hereinafter pointed out. It is to be noted that the most difficulties in the starting of a vehicle arise when the vehicle is facing up a hill and with the brakes applied and the present invention is particularly advantageous in this connection.

When it is desired to release the brakes with the vehicle in the position just referred to, this is accomplished by depressing the accelerator pedal 117 and moving the accelerator control valve 115 to a position to admit air to the left hand end of the cylinder 15 through the passageway 104, chamber 103, groove 122, port 110 and passageway 125. As soon as there is any tendency at the right hand end of the cylinder 15 for pressure to build up, the atmospheric check valve 23 opens and releases the air therethrough to the atmosphere.

The pendulum and the control valve 155 actuated thereby, by reason of the inclination of the vehicle, has taken a position so that the port 143 is cut off from communication with the port 145, and no air is permitted to pass the pendulum control valve 155 in this condition.

If the vehicle is inclined downwardly, the operations which occur are substantially the same as when the vehicle is on the level, and this condition of operation need not therefore be pointed out in detail.

The control by the pendulum control valve 155 is of particular importance in connection with the fluid flow with respect to the right hand end of the cylinder 15, the flow being effected by the chattering movement in small increments so that a step by step movement of the piston, rather than a sudden movement thereof, is effected. It will be noted that if the atmospheric check valve 23 is set to open relatively easily and the spring 157 which controls the oscillatory or chattering movement of the pendulum control valve 155 is set relatively loose so that the chattering action is influenced less by the spring 157, and the valve 155 is not held open as long a time, the amount of fluid discharged from the cylinder by way of the pendulum control valve 155 will be relatively smaller, and a more rapid and less smooth brake releasing action will be obtained. If, on the other hand, the atmospheric check valve 23 is set or adjusted so that a somewhat higher pressure is required before this valve 23 opens, and the spring 157 is set relatively tight so that the valve 155 is influenced more by the spring 157 to open position, then a larger quantity of fluid will be discharged by way of the pendulum valve 155 and a somewhat slower and smoother brake releasing action will be obtained.

The setting of the spring 68 of the compensator valve 60 will determine the ease of admission of air to the right hand end of the cylinder 15.

If it is desired to operate the vehicle without using the control system of the present invention, the dash board control valve 92 may be actuated to bring the dash board control valve 92 to a position as illustrated in Fig. 6, and the passageway 108 in communication with the port 106. It will be seen that, irrespective of the position of the accelerator control valve 115, no suction will be applied to the left hand end of the cylinder 15, air at atmospheric pressure will be admitted to and exhausted from both ends of the cylinder 15, and the piston 35 will move freely in the cylinder 15 and not interfere with the ordinary and conventional application and release of the brakes.

I claim:—

1. A control system for automotive vehicle brakes comprising a cylinder, a piston therein connected to the vehicle brake system, and means for controlling the movement of the piston including a valve responsive to the inclination of the vehicle and a valve actuated with the accelerator pedal of the vehicle, said last named valve having a passageway for connecting the cylinder at one side of said piston to a vacuum and having a passageway for connecting the same side of said cylinder to the atmosphere.

2. A control system for automotive vehicle brakes comprising a cylinder, a piston therein connected to the vehicle brake system, and means for controlling the movement of the piston, said means including a valve, a pendulum for actuating said valve, and a valve actuated with the accelerator pedal of the vehicle, said last named valve having a passageway for connecting the cylinder at one side of said piston to a vacuum and having portions for connecting both portions of said cylinder to the atmosphere.

3. A control system for automotive vehicle brakes comprising means for applying and releasing the brakes, and supplemental means for holding the brakes applied and for releasing the brakes under the control of the operator, said means including a cylinder, a piston therein connected to the vehicle brake system, and means for controlling the movement of the piston including a valve, a pendulum responsive to the upward inclination of the vehicle for actuating said valve, an accelerator pedal, and a valve actuated with the accelerator pedal of the vehicle, said valve having a passageway for connecting the cylinder at one side of said piston to a vacuum and having a passageway for connecting the same portion of said cylinder to the atmosphere.

4. In a control system for the brakes of an automotive vehicle, the combination of a cylinder, a piston therein connected to the vehicle brake system, and means for controlling the movement of the piston including an accelerator pedal, a valve actuated with the accelerator pedal of the vehicle, said valve having a passageway for connecting the cylinder at one side of said piston to a vacuum and having a passageway for connecting the same portion of said cylinder to the atmosphere, said valve also having a passageway for connecting the other side of the cylinder to the atmosphere, another valve, and a pendulum responsive to the upward inclination of the vehicle for actuating said other valve.

5. In a control system for the brakes of an automotive vehicle, the combination with a source of suction of a cylinder, a piston in said cylinder connected to the vehicle brake system, and means for controlling the movement of said piston, said means including a fluid conduit connected to one end of said cylinder, valve mechanism for connecting said conduit with the source of suction or with the atmosphere, a fluid conduit connected to the other end of said cylinder, and oscillatory valve mechanism in said last named conduit for controlling the communication through said conduit.

6. In a control system for the brakes of an automotive vehicle, the combination with a source of suction of a cylinder, a piston in said cylinder connected to the vehicle brake system, and means for controlling the movement of said piston, said means including a fluid conduit connected to one end of said cylinder, an accelerator device, valve mechanism connected to said accelerator device for connecting said conduit under the control of the operator with the source of suction or with the atmosphere, a fluid conduit connected to the other end of said cylinder, and valve mechanism in said last named conduit responsive to the inclination of the vehicle for shutting off communication through said conduit.

7. In a control system for the brakes of an automotive vehicle, the combination with a source of suction of a cylinder, a piston in said cylinder connected to the vehicle brake system, and means for controlling the movement of said piston, said means including a fluid conduit connected to one end of said cylinder, a second fluid conduit connected to the other end of said cylinder, valve mechanism under the control of the operator for controlling the flow of fluid through said conduits, said valve mechanism including passageways for selectively connecting said first named fluid conduit with the source of suction or with the atmosphere, and other passageways for selectively shutting off communication through said second fluid conduit or for connecting said fluid conduit to the atmosphere, and valve mechanism in said second fluid conduit between the first named valve mechanism and said cylinder responsive to the inclination of the vehicle for permitting fluid flow through said conduit or for shutting off communication through said conduit.

8. In a control system for the brakes of an automotive vehicle, the combination with a source of suction of a cylinder, a piston in said cylinder connected to the vehicle brake system, and means for controlling the movement of said piston, said means including a fluid conduit connected to one end of said cylinder, a second fluid conduit connected to the other end of said cylinder, an accelerator device, valve mechanism connected to said accelerator device for controlling fluid flow through said conduits under the control of the operator, said valve mechanism including passageways for connecting said first named fluid conduit with the source of suction or with the atmosphere and another passageway for shutting off communication through said second fluid conduit or for connecting said fluid conduit to the atmosphere, and valve mechanism in said second conduit between the first named valve mechanism and said cylinder responsive to the inclination of the vehicle for permitting fluid flow through said conduit or for shutting off communication through said conduit.

9. A control system for automotive vehicle brakes comprising an accelerator device, and means for controlling the release of the brakes, said means including mechanism connected to the accelerator device and subject to the control of the operator, said means also including a pendulum mechanism operable when the vehicle is level for assisting in the release of the brakes.

10. A control system for automotive vehicle brakes comprising an accelerator device, and means for controlling the applying and release of the brakes, said means including mechanism connected to the accelerator device and subject to the control of the operator, said means also including a pendulum mechanism operable when the vehicle is level for assisting in the release of the brakes.

11. A control system for automotive vehicle brakes comprising an accelerator device, means operable with said accelerator device for controlling the applying and releasing of the brakes, and means including a pendulum mechanism operable to modify the control effected by said means and assist in the release of the brakes when the vehicle is level.

12. A system for controlling the release of automotive vehicle brakes including an expansible chamber device connected to the brakes, control valve mechanism for said device, an accelerator device to which said valve mechanism is connected, and a pendulum actuated valve mechanism for assisting in the release of the brakes when the vehicle is level and ineffective when the vehicle is inclined upwardly.

JOSEPH H. COYLE.